United States Patent [19]
Gogarty

[11] 3,759,325
[45] Sept. 18, 1973

[54] FOAM FOR SECONDARY AND TERTIARY RECOVERY

[75] Inventor: William B. Gogarty, Littleton, Colo

[73] Assignee: Marathon Oil Company, Findlay, Ohio

[22] Filed: June 24, 1971

[21] Appl. No.: 156,553

[52] U.S. Cl. .............................. 166/273, 166/274
[51] Int. Cl. ............................................. E21b 43/22
[58] Field of Search .......... 166/273–275, 309, 305 R

[56] References Cited
UNITED STATES PATENTS

| | | | |
|---|---|---|---|
| 3,254,714 | 6/1966 | Gogarty | 166/274 |
| 3,275,075 | 9/1966 | Gogarty et al. | 166/274 |
| 3,185,634 | 5/1965 | Craig, Jr. et al. | 166/273 |
| 3,196,944 | 7/1965 | Bernard et al. | 166/273 |
| 3,269,460 | 8/1966 | Hardy et al. | 166/274 |
| 3,529,668 | 9/1970 | Bernard | 166/273 |
| 3,648,772 | 3/1972 | Earlougher, Jr. | 166/273 |
| 3,500,919 | 3/1970 | Holm | 166/273 |
| 3,406,754 | 10/1968 | Gogarty | 166/273 |

Primary Examiner—Stephen J. Novosad
Attorney—Joseph C. Herring et al.

[57] ABSTRACT

Oil is moved in a subterranean oil-bearing formation by displacing the oil with a foamed oil-external micellar dispersion. The micellar dispersion, before foaming, contains 2 – 90 percent by volume hydrocarbon, at least about 4 percent by volume surfactant, about 5 – 90 percent by volume aqueous medium, and optionally 0.01 – 20 percent by volume cosurfactant and/or 0.0001 – 5 percent by weight electrolyte. Useful gases for foaming the dispersion include air, natural gas, nitrogen, flue gases, etc. The dispersion can be foamed before it is injected into the formation or it can be foamed in situ of the formation. A mobility buffer fluid and/or drive fluid may be used to displace the foam toward a production well to recover crude oil therethrough.

26 Claims, No Drawings

FOAM FOR SECONDARY AND TERTIARY RECOVERY

CROSS REFERENCE TO RELATED APPLICATIONS

U.S. Pat. application Ser. No. 12,457, titled "Use of Surfactant Foam for Recovery of Petroleum," filed 2/18/70, teaches the use of foamed water-external micellar dispersions to recover crude oil from subterranean formations.

BACKGROUND OF THE INVENTION

Field of the Invention

This invention relates to secondary recovery processes (including tertiary, etc.) of oil from subterranean oil-bearing formations. More specifically, foamed oil-external micellar dispersions comprised of hydrocarbon, surfactant, and aqueous medium are injected into and displaced through the formation. The micellar dispersion is foamed in situ, in the well bore, or on the surface.

Description of the Prior Art

Foam flooding is a recognized method to recover crude oil from subterranean formations. Disadvantages of prior art, foam flooding processes are (1) unattractive oil recoveries, (2) foam tends to degrade or lose its physical characteristics as it is displaced through the formation, (3) lack of mobility control behind the foam, etc.

U.S. Pat. No. 2,866,507 to Bond et al teaches oil recovery by injecting and displacing through a reservoir a foam formed by injecting gas into an aqueous solution containing a water-soluble foaming agent.

U.S. Pat. No. 3,177,939 to Holm et al teaches a foam flooding process by the sequential injection of (1) aqueous solution containing a surfactant, (2) a foam-producing gas, (3) a $C_3$—$C_{10}$ hydrocarbon and (4) an alcohol.

U.S. Pat. No. 3,196,944 to Bernard et al teaches a foam flooding process using a mixture of $C_8$ or lower hydrocarbon along with an oil-soluble foaming agent.

U.S. Pat. No. 3,318,379 to Bond et al teaches in situ formation of a foam by first injecting a hydrocarbon mixture containing a surfactant, followed by a surfactant-free non-gaseous liquid miscible with the first injected slug and then injecting a gas which causes the first slug to foam.

U.S. Pat. No. 3,530,943 to Dauben et al teaches forming a foam in an earth formation by using a film-forming water-soluble polymer in an aqueous foaming solution. The polymer tends to stabilize the foam against the adverse effects of high temperatures. Examples of polymers include polyvinyl alcohols and polyvinyl pyrrolidones.

SUMMARY OF THE INVENTION

Applicant has discovered a method of displacing crude oil from subterranean formations using a foamed oil-external micellar dispersion. Foaming of the micellar dispersion can be accomplished on the surface, in the well bore and in situ of the formation. Optionally, the foamed micellar dispersion can be displaced by a mobility buffer fluid and/or a drive fluid. The micellar dispersion contains aqueous medium, hydrocarbon, surfactant, and optionally cosurfactant and/or electrolyte. Examples of gases useful to foam the dispersion include air, natural gas, combustion products of natural gas, nitrogen, etc.

PREFERRED EMBODIMENTS OF THE INVENTION

The micellar dispersion of this invention is oil-external. It is comprised of hydrocarbon, aqueous medium, surfactant, and optionally cosurfactant and/or electrolyte. The oil-external micellar dispersion is foamed with any gas compatible with the micellar dispersion components as well as the subterranean formation. The micellar dispersion can be foamed in situ, on the surface, or while the dispersion is being injected through the injection means into the oil-bearing formation.

The hydrocarbon within the micellar dispersion can be crude oil, a partially refined fraction of crude oil (crude column overheads, gas oils, kerosene, naphthas, straight run gasoline, liquefied petroleum gases, etc.), refined fractions of crude oil (e.g. pentane, heptane, etc.) or synthesized hydrocarbons (including halogenated hydrocarbons, hydrocarbons having groups substituted on the hydrocarbon molecule to impart desired characteristics), etc. Examples of surfactants include those defined in U.S. Pat. No. 3,254,714 to Gogarty et al; preferably the surfactant is a petroleum sulfonate having an average equivalent weight within the range of about 350 to about 525, more preferably about 390 to about 470. The petroleum sulfonate is preferably a mono-valent cation containing sulfonate. The aqueous medium can be soft, brackish or brine water; but, where the water contains ions, the ions are preferably compatible with the ions within the subterranean formation. The cosurfactant can be an alcohol, amine, ester, aldehyde, ketone, ether, or like compound containing one to about 20 carbon atoms. The electrolyte can be an inorganic salt, inorganic base, inorganic acid, or similar organic compounds. Examples of volume amounts include about 2 to about 90 percent hydrocarbon, at least about 4 percent surfactant, about 5 to about 90 percent aqueous medium, about 0.001 to about 20 percent cosurfactant, and about 0.001 to about 5 percent by weight of electrolyte. Specific examples of useful components with this invention can be found in U.S. Pat. Nos. 3,254,714, to Gogarty et al; 3,275,075 to Gogarty et al; 3,330,343 to Tosch et al; and 3,497,006 to Jones et al.

The foam is obtained by intimately contacting the oil-external micellar dispersion with a compatible gas. Examples of gases compatible in a majority of reservoirs include air, nitrogen, natural gas, combustion products of natural gas (also referred to as flue gases), carbon dioxide, low molecular weight hydrocarbons, carbon monoxide, oxygen, mixtures of the above and like materials. The gas is preferably in a substantially gaseous state at reservoir conditions, i.e., reservoir temperature and pressure.

The foam may be generated on the surface and then injected through or by the injection means into the formation. Also, the foam may be generated in the well bore, e.g. while the micellar dispersion and gas are progressing down the injection means into the formation; this can be accomplished by alternately pumping micellar dispersion and gas into the injection means or mixing the two via nozzles in the well bore. Another method is to inject the micellar dispersion and gas simultaneously in separate tubing strings wherein the outlets are positioned to permit generation of the foam downhole. In addition, the foam can be generated in situ, e.g. the dispersion can be injected into the formation followed by a sufficient amount of gas to foam the previously injected micellar dispersion. Also, alternate slugs of micellar dispersion and gas can be injected into the formation to form the foam in situ.

Where the foam is generated in situ, preferably about 0.1–20 percent formation pore volume of liquid micellar dispersion is injected along with sufficient volumes of the gas to foam the micellar dispersion. Where the foamed micellar dispersion is injected into the reservoir, preferably about 0.5 to about 40 percent and more preferably about 5 to about 20 percent formation pore volume of the foam is injected. Where it is desired to stimulate the injection well, minimum amounts of the foamed micellar dispersion are preferably injected; e.g. about 0.1 to about 10 barrels of micellar dispersion per vertical foot of oil-bearing formation are injected followed by sufficient volumes of gas to foam at least 20 percent of the dispersion or this equivalent volume of dispersion can be foamed and then injected into the formation.

It may be desirable to generate the foam in situ of the formation at a point removed from the wellbore. This is accomplished by injecting and displacing the micellar dispersion within the formation at the desired location and then injecting through another injection means, the foam-producing gas so it will come in contact with the micellar dispersion and foam the dispersion.

Volumes of gas useful to foam the oil-external micellar dispersion include about 0.5 to about 30 or more and preferably about 5 to about 15 volumes of gas per volume of micellar dispersion, the volumes of gas based on reservoir temperature and pressure. Too much gas may produce what is called a "dry foam" and allow gas breakthrough during the flooding process, thus adversely influencing the recovery.

The foamed oil-external micellar dispersion may be displaced through the reservoir by a drive fluid or a combination mobility buffer fluid and a drive fluid.

Examples of useful drive fluids include water, thickened water, brine, LPG (liquefied petroleum gas), natural gas, air, oxygen, nitrogen, methane, combustion products of natural gas, and like materials. Water is the preferred drive material where the foamed micellar dispersion is followed by a mobility buffer fluid. When the mobility buffer fluid is not used, air or natural gas is the preferred drive material. Any drive material which is compatible with the reservoir and the foamed micellar dispersion is useful. Sufficient amounts of the drive fluid are injected to displace the foamed micellar dispersion toward the producing well.

Where a mobility buffer fluid is used, the foamed micellar dispersion is first injected followed by the mobility buffer fluid and then a drive fluid is used to displace the first two slugs toward the producing well. Examples of useful mobility buffer fluids include any aqueous or nonaqueous fluid containing a mobility reducing agent which effectively reduces the mobility of the fluid; the purpose is to impart a favorable mobility control for efficient oil recovery. Specific examples of mobility buffer fluids include water containing mobility reducing agents such as partially hydrolyzed, high molecular weight polyacrylamides, polysaccharides, polyethylene oxides, carboxymethyl cellulose, carboxyvinyl polymers, polyethylene glycol, biopolymers, etc. Also, the mobility buffer fluid can be a hydrocarbon containing a mobility reducing agent such as polyisobutylene and other high molecular weight hydrocarbon agents. Any mobility reducing agent is useful as long as the agent effectively reduces the mobility of the mobility buffer fluid while the fluid flows in the reservoir and is compatible within the reservoir.

Examples of volume amounts of useful mobility buffer fluids include about 5 to about 80 percent, preferably about 20 to 70 percent formation pore volume. The mobility buffer fluid can be graded from a low mobility at the juncture of the foamed micellar dispersion and mobility buffer fluid to a high mobility at the rear end of the mobility buffer fluid, e.g. a high mobility approaching that of the mobility of a subsequently injected drive fluid.

The foamed micellar dispersion, mobility buffer fluid, and drive fluid can contain other additives to impart desired characteristics in the formation. For example, bactericides, oxygen scavenging agents, etc. may be incorporated.

In certain cases it may be desired to foam only the back portion of the injected oil-external micellar dispersion. With this invention, at least 20 percent of the micellar dispersion is foamed to obtain efficient oil recovery.

The following examples are presented to teach specific working embodiments of the invention. Unless otherwise specified, all percents are based on volume.

EXAMPLE I

A rectangular, plexiglass container having inside dimensions of ½ inches wide, 4 inches high, and 6 feet long is filled with 48 to 65 mesh sand; permeability of the sand pack is 43 darcies and porosity is 40 percent. The sand is first flooded with an aqueous solution containing 2 percent sodium chloride. Thereafter, oil is flowed through the sandpack until residual water saturation is reached, this value about 31 percent. About 10 percent formation pore volume of a micellar dispersion composed of 10 percent ammonium petroleum sulfonate, 2 percent primary amyl alcohol, 50 percent water and the residue crude oil (viscositY of the oil is about 7 cp. at ambient temperature) is injected into the sand pack. Thereafter, air is injected to foam the micellar dispersion and to displace the foam through the sand pack. About 62 percent of the oil is recovered from the sand pack by the foamed micellar dispersion.

EXAMPLE II

The procedure of Example I is repeated except 15 percent formation pore volume of the oil-external micellar dispersion is injected and sufficient quantities of air are injected thereafter to foam the micellar dispersion. In this example, 71 percent of the oil is recovered from the sand pack.

EXAMPLE III

The procedure of Example I is duplicated except the sand pack is flooded with water after being flooded with the oil, to reduce the sand pack to residual oil saturation, i.e. now the sand pack is in a tertiary condition. About 10 percent formation pore volume of the oil-external micellar dispersion is injected and thereafter sufficient volumes of air are injected to foam the micellar dispersion. 79 percent of the oil is recovered from the tertiary conditioned sand pack.

EXAMPLE IV

The procedure of Example I is duplicated except the sand pack is flooded with water, after being flooded with oil, to reduce the oil saturation to residual oil saturation, i.e. a tertiary condition. Thereafter, 15 percent formation pore volume of the micellar dispersion is injected followed by a sufficient volume of air to foam the micellar dispersion and displace the foam through the sand pack. About 83 percent of the oil is recovered from the sand pack.

EXAMPLE V

A consolidated sandstone core is first saturated with water, then flooded with oil to residual water saturation and is then flooded with water to residual oil saturation. Thereafter, the equivalent of 2.5 percent formation pore volume of an oil-external micellar dispersion (composed of 24 percent water, 10.5 percent petroleum sulfonate, 3.8 percent isopropyl alcohol, and the residue straight run gasoline) is foamed with approximately five volumes, based on the volume of the micellar dispersion, of natural gas. The foamed micellar dispersion is then injected into the sandstone core and this, in turn, followed by a mobility buffer slug composed of water containing partially hydrolyzed, high molecular weight polyacrylamide. Sufficient amounts of the mobility buffer are injected to displace the micellar dispersion through the core. Economically attractive quantities of oil are recovered from the core.

The above specific embodiments are not meant to restrict the invention. Rather, all equivalents obvious to those skilled in the art are intended to be incorporated within the scope of the invention as defined within the specification and appended claims.

What is claimed is:

1. A process for recovering oil from an oil-bearing subterranean formation having an injection means in fluid communication with a production means, the process comprising:
   1. displacing a foam through the oil-bearing formation toward the production means, the foam obtained by foaming at least about 20 percent by volume of an oil-external micellar dispersion with a foam-producing gas compatible with the micellar dispersion, and
   2. recovering crude oil through said production means.

2. The process of claim 1 wherein the foam is produced in the subterranean formation by contacting the micellar dispersion with the foam-producing gas.

3. The process of claim 1 wherein the foam is produced at the surface and then injected into the subterranean formation.

4. The process of claim 1 wherein the micellar dispersion is comprised of hydrocarbon, aqueous medium and surfactant.

5. The process of claim 4 wherein the micellar dispersion contains cosurfactant or electrolyte or cosurfactant and electrolyte.

6. The process of claim 1 wherein the foamed micellar dispersion is displaced through the subterranean formation by injecting a drive fluid into the formation.

7. The process of claim 6 wherein the drive fluid is a gas.

8. The process of claim 1 wherein the foamed micellar dispersion is displaced through the formation by injecting a mobility buffer fluid behind the foamed micellar dispersion and thereafter injecting a drive fluid to displace the foamed micellar dispersion and mobility buffer fluid toward the production means.

9. The process of claim 8 wherein about 5 to about 80 percent formation pore volume of the mobility buffer fluid is injected.

10. The process of claim 1 wherein about 0.5 to about 30 volumes of the foam producing gas is used to foam the oil-external micellar dispersion, the volume of gas based on the volume of the micellar dispersion.

11. The process of claim 1 wherein the micellar dispersion is comprised of about 2 to about 90 percent by volume hydrocarbon, about 5 to about 90 percent by volume aqueous medium, and at least about 4 percent by volume of surfactant.

12. The process of claim 1 wherein the foam is produced in the well bore of the injection means and is then injected into the formation.

13. A process for recovering crude oil from an oil-bearing subterranean formation having at least one injection means in fluid communication with at least one production means, the process comprising:
   1. injecting into the formation about 0.5 to about 20 percent formation pore volume of an oil-external micellar dispersion comprised of about 2 to about 90 percent by volume hydrocarbon, about 5 to about 90 percent by volume aqueous medium, at least about 4 percent of a petroleum sulfonate, and
   2. injecting sufficient volumes of a foam-producing gas during the injection of the micellar dispersion to foam at least about 20 percent of the injected oil-external micellar dispersion, the foam-producing gas being compatible with the micellar dispersion and the subterranean formation, and
   3. thereafter displacing the foamed micellar dispersion toward the production means to recover crude oil therethrough.

14. The process of claim 13 wherein about 5 to about 80 percent formation pore volume of a mobility buffer fluid is injected behind the foamed micellar dispersion.

15. The process of claim 13 wherein a water drive is injected behind the foamed micellar dispersion to displace it toward the production means.

16. The process of claim 14 wherein the mobility buffer fluid is an aqueous solution containing a mobility reducing agent.

17. A process for recovering crude oil from an oil-bearing subterranean formation having at least one injection means in fluid communication with at least one production means, the process comprising:
   1. injecting a foamed oil-external micellar dispersion into the formation, the volume of the micellar dispersion before foaming equivalent to 0.5 to about 20 percent formation pore volume and the micellar dispersion comprised of about 2 to about 90 percent by volume hydrocarbon, about 5 to about 90 percent by volume aqueous medium, and at least about 4 percent of a petroleum sulfonate, and
   2. thereafter injecting into the formation about 5 to about 80 percent formation pore volume of a mobility buffer fluid, and then
   3. injecting sufficient amounts of a drive fluid to displace the foamed micellar dispersion and mobility buffer fluid toward the production means to recover crude oil therethrough.

18. The process of claim 17 wherein the mobility buffer fluid is an aqueous solution containing a partially hydrolyzed, high molecular weight polyacrylamide.

19. The process of claim 17 wherein drive water is injected to displace the foamed micellar dispersion and mobility buffer fluid toward the production means.

20. The process of claim 17 wherein the micellar dispersion is foamed with air.

21. The process of claim 17 wherein the micellar dispersion is foamed with natural gas.

22. The process of claim 17 wherein the micellar dispersion is foamed with combustion products of natural gas.

23. A process for increasing the injectivity of injection wells in fluid communication with an oil-bearing subterranean formation, the process comprising injecting into the formation the equivalent of about 0.1 to about 10 barrels per vertical foot of oil-bearing formation of an oil-external micellar dispersion wherein at least 20 percent of the micellar dispersion is foamed with a foam-producing gas compatible with the dispersion and displacing it out into the formation.

24. The process of claim 23 wherein at least a portion of the micellar dispersion is foamed in situ of the formation.

25. The process of claim 23 wherein the micellar dispersion is substantially foamed before it enters the formation.

26. The process of claim 23 wherein the foamed micellar dispersion is displaced into the formation by a water drive.

* * * * *